(12) United States Patent
Voellmicke et al.

(10) Patent No.: US 12,179,175 B2
(45) Date of Patent: Dec. 31, 2024

(54) POLYMER COMPOSITIONS COMPRISING ACTIVE CARBON FOR FORMALDEHYDE SORPTION

(71) Applicant: CSP TECHNOLOGIES, INC., Auburn, AL (US)

(72) Inventors: Craig Voellmicke, New York, NY (US); Jason Pratt, Auburn, AL (US); James S. Hollinger, Auburn, AL (US)

(73) Assignee: CSP TECHNOLOGIES, INC., Auburn, AL (US)

( * ) Notice: Subject to any disclaimer, the term of this patent is extended or adjusted under 35 U.S.C. 154(b) by 646 days.

(21) Appl. No.: 17/594,463

(22) PCT Filed: Apr. 15, 2020

(86) PCT No.: PCT/US2020/028194
§ 371 (c)(1),
(2) Date: Oct. 18, 2021

(87) PCT Pub. No.: WO2020/214632
PCT Pub. Date: Oct. 22, 2020

(65) Prior Publication Data
US 2022/0161232 A1 May 26, 2022

Related U.S. Application Data

(60) Provisional application No. 62/835,068, filed on Apr. 17, 2019.

(51) Int. Cl.
*B01D 53/72* (2006.01)
*B01D 53/82* (2006.01)
(Continued)

(52) U.S. Cl.
CPC ........ *B01J 20/28026* (2013.01); *B01D 53/72* (2013.01); *B01D 53/82* (2013.01);
(Continued)

(58) Field of Classification Search
None
See application file for complete search history.

(56) References Cited

U.S. PATENT DOCUMENTS 4,374,814 A 2/1983 Gaylord
4,724,242 A 2/1988 Vassileff
(Continued)

FOREIGN PATENT DOCUMENTS

CA 3061175 A1 11/2018
CN 101468305 A 7/2009
(Continued)

OTHER PUBLICATIONS

International Search Report of PCT/US2020/028194 mailed Jul. 17, 2020.
(Continued)

*Primary Examiner* — Daniel Berns
(74) *Attorney, Agent, or Firm* — Carol A. Marmo; Eckert Seamans Cherin & Mellott, LLC (57) ABSTRACT

Disclosed are polymer compositions comprising activated carbon and method of making the polymer compositions that are used for sorption of formaldehyde from air, gas or liquids. The activated carbon is entrained in at least one base polymer with optional channels throughout.

14 Claims, 3 Drawing Sheets

(51) Int. Cl.
  *B01J 20/20* (2006.01)
  *B01J 20/26* (2006.01)
  *B01J 20/28* (2006.01)
  *B01J 20/30* (2006.01)

(52) U.S. Cl.
  CPC ............. *B01J 20/20* (2013.01); *B01J 20/261* (2013.01); *B01J 20/28042* (2013.01); *B01J 20/3007* (2013.01); *B01J 20/3085* (2013.01); *B01D 2253/102* (2013.01); *B01D 2253/202* (2013.01); *B01D 2253/342* (2013.01); *B01D 2257/70* (2013.01); *B01J 2220/46* (2013.01)

(56) References Cited

U.S. PATENT DOCUMENTS

| | | | |
|---|---|---|---|
| 5,447,794 A * | 9/1995 | Lin | D02G 3/445 428/374 |
| 9,902,788 B2 | 2/2018 | Klein et al. | |
| 10,688,467 B2 | 6/2020 | Holbrook et al. | |
| 11,534,519 B2 | 12/2022 | Takeuchi et al. | |
| 2017/0113203 A1 * | 4/2017 | Rezuke | B01J 20/20 |
| 2018/0001296 A1 | 1/2018 | Holbrook et al. | |
| 2018/0297008 A1 | 10/2018 | Stabler | |

FOREIGN PATENT DOCUMENTS

| | | |
|---|---|---|
| CN | 105073876 A | 11/2015 |
| CN | 107096512 A | 8/2017 |
| CN | 107469787 A | 12/2017 |
| CN | 109642705 A | 4/2019 |
| JP | H11347109 A | 12/1999 |
| JP | 2015-006918 A | 1/2015 |
| JP | 2017-094258 A | 6/2017 |
| WO | 2017139555 A1 | 8/2017 |
| WO | 2018/145099 A1 | 8/2018 |

OTHER PUBLICATIONS

Written Opinion of ISR of PCT/US2020/028194 mailed Jul. 17, 2020.

* cited by examiner

POLYMER COMPOSITIONS COMPRISING ACTIVE CARBON FOR FORMALDEHYDE SORPTION

CROSS-REFERENCE TO RELATED APPLICATION

The present application is a National Phase of International Application No. PCT/US2020/028194, filed Apr. 15, 2020, which claims priority to U.S. Provisional Patent Application No. 62/835,068, titled "ENTRAINED POLYMERS AS FORMALDEHYDE SCAVENGER" and filed Apr. 17, 2019, the entire disclosures of which are hereby incorporated by reference in their entirety.

FIELD OF INVENTION

This invention relates to polymer materials that are used to adsorb or absorb formaldehyde from gas or liquid. The polymer compositions comprise active carbon as the active agent. The polymer compositions are incorporated into various applications such as packaging materials. In a specific embodiment, the polymer compositions of the invention reduce the cross-linking effect caused by the presence of formaldehyde in gelatin.

BACKGROUND AND DESCRIPTION OF RELATED ART

Formaldehyde, also known as methanal or formic acid, is a naturally occurring organic compound of the formula $CH_2O$. It is the simplest of the aldehydes. Formaldehyde is an important precursor to many materials and chemical compounds. It is a colorless, strong-smelling gas used in making building materials and many household products. It is used in the manufacturing of plastic resins; pressed-wood products, such as particleboard, plywood, and fiberboard; glues and adhesives; permanent-press fabrics in the textile industry; paper product coatings; and certain insulation materials. Formaldehyde is ubiquitous in the environment, is present as impurities or degradation products and is produced from both natural and manmade sources.

In the area of packaging products, in some cases, free formaldehyde is retained in fully cured composites, laminates and coatings. Gaseous formaldehyde may be released slowly from cured compositions at room temperature or at slightly elevated temperatures in the presence of water or under high humidity conditions. Since formaldehyde is volatile and remains a gas under ambient temperature and pressure, it escapes into the air during the manufacture of the polymers, resins and other materials and the products prepared therefrom. The release of gaseous formaldehyde may also occur when the finished product is in place or in use.

Formaldehyde also exists in many animal and plant species as a product of their natural and normal metabolism. Ingestion of a small amount of formaldehyde by humans is unlikely to cause acute effect, but ingestion of a large amount of formaldehyde can generally cause severe abdominal pain, vomiting, coma, renal injury and possible death. The general population may also be exposed to formaldehyde by inhalation of atmospheric gases. A main health concern of formaldehyde is its cancer causing ability. The International Agency for Research on Cancer of the World Health Organization has classified formaldehyde as "carcinogenic to humans", with consideration that there was sufficient evidence for causing nasopharyngeal cancer in humans, strong potential evidence for causation of leukemia and for occupational exposure.

As a product of normal metabolism, formaldehyde has been documented to be naturally present in many common food items, including fruits and vegetables, meats, fish, crustaceans and dried mushrooms, among others. In some seafood species, formaldehyde is a natural breakdown product of a chemical known as trimethylamine oxide (TMAO) that exists in the body of the organism. Trimethylamine oxide breaks down into formaldehyde and dimethylamine in equal parts after the animal dies. The level of formaldehyde can accumulate in certain marine fish during frozen storage and in crustaceans after death and creates potential health risk to humans upon ingestion of these food products.

With respect to the presence of formaldehyde in the atmosphere, liquid absorbents, such as aqueous solutions or ammonium bicarbonate, or solid absorbents, such as activated carbon, have been used for the absorption of gaseous formaldehyde from the atmosphere. Water and liquid absorbents in scrubbing towers have been used in manufacturing facilities where large volumes of air are recirculated. It has further been found that gaseous formaldehyde may be removed from the atmosphere under ambient conditions by coming into contact with solid shaped compositions prepared by coating a solid substrate or impregnating a porous or fibrous solid substrate with polyhydric water-soluble polymers and water and solid absorbents such as oxidizing agents. Such oxidizing agents, such as metal peroxides and potassium permanganate, are effective in converting formaldehyde into formic acid. However, they are non-selective and rapidly lose their reactivity by indiscriminate oxidation of other contaminants and pollutants which have reducing characteristics, such as mercaptans, hydrogen sulfide and carbon monoxide. Formaldehyde removal has also been attempted by oxidation of the formaldehyde by passing air through or over alkaline earth metal peroxides or alumina or clay pellets impregnated with potassium permanganate. However, these processes are expensive and impractical for use in small areas or in packaging containers used for formaldehyde-emitting products.

In the pharmaceutical industry, gelatin capsules have long been used to encapsulate dosage forms of various medicines. The integrity and stability of the gelatin capsules is critical in maintaining the safety and effectiveness of the pharmaceutical product retained in the capsule. However, gelatin-containing products such as gelatin capsules are vulnerable to cross-linking. "Cross-linking" refers to a process whereby a bond is formed that links one polymer chain to another. These links may take the form of covalent bonds or ionic bonds and usually cause a change in the physical properties of the polymer. As such, cross-linking can slow or prevent drug release from a gelatin capsule resulting in highly variable and out-of-specification dissolution results of the drug product. Formaldehyde is an agent known to cause cross-linking of gelatin. Hakata T., Sato H., Watanabe Y., Matsumoto M. 1994. Effect of Formaldehyde on the Physiochemical Properties of Soft Gelatin Capsule Shells. Chem. Pharm. Bull. 42(5) 1138-1142. Accordingly, there is a need for a composition or a method that adsorbs or absorbs formaldehyde in pharmaceutical packaging and encapsulation in order to preserve the safety, effectiveness and storage of drug products.

Activated carbon is known to adsorb water and many volatile organic compounds including formaldehyde and formic acid. It has been taught that solid absorbents such as activated carbon are effective at removing formaldehyde gas at normal temperatures but lose their efficiency when the temperature or humidity levels rise. For example, in hot, humid conditions, which favor formaldehyde vapor release, the absorbing capacity of activated carbon is typically reduced and the formaldehyde may become desorbed and liberated into the ambient air. A need for compositions with activated carbon exists that are effective at scavenge formaldehyde and retaining it effectively within an enclosed environment such as a package or container.

A number of technologies have been developed for the removal of formaldehyde in industrial processes, in food packaging and in pharmaceutical packaging, but the need for more effective and safe products continues to exist.

SUMMARY OF THE INVENTION

Provided herein is a polymer composition and method of making a polymer composition for formaldehyde sorption from air, gas or liquid, the process comprising the steps of providing a base polymer; adding an activated carbon to the base polymer; and optionally, adding a channeling agent to the base polymer. The process further comprising the step of activating the activated carbon by contacting the polymer composition with liquid or steam.

The polymer composition is formed by extrusion molding, injection molding, blow molding, vacuum molding or hot melt dispensing. The polymer composition may be formed into a granule, a pellet, a film, a sheet, a disk, a cover, a plug, a cap, a lid, an insert, a stopper, a gasket, a seal, a washer, a liner, a ring, a container or a package. The polymer composition may be further incorporated into a packaging material selected from plastic, paper, glass, metal, ceramic, synthetic resin or a combination thereof.

A certain embodiment is disclosed wherein the polymer composition comprises polypropylene as the base polymer, tris(hydroxymethyl)aminomethane as the activated carbon, and optionally, polyethylene glycol as the channeling agent.

In an alternate embodiment, the polymer composition is in the form of a film and is provided in a blister pack or a gel pack.

BRIEF DESCRIPTION OF THE DRAWINGS

The following detailed description of the presently disclosed technology will be better understood when read in conjunction with the appended drawings. For the purpose of illustrating the presently disclosed technology, there are shown in the drawings various illustrative embodiments. It should be understood, however, that the presently disclosed technology is not limited to the precise arrangements and instrumentalities shown. The invention will be described in conjunction with the following drawings in which like reference numerals designate like elements and wherein.

DETAILED DESCRIPTION OF THE INVENTION

While systems, devices and methods are described herein by way of examples and embodiments, those skilled in the art recognize that the presently disclosed technology is not limited to the embodiments or drawings described. Rather, the presently disclosed technology covers all modifications, equivalents and alternatives falling within the spirit and scope of the appended claims. Features of any one embodiment disclosed herein can be omitted or incorporated into other embodiments.

Definitions

Any headings used herein are for organizational purposes only and are not meant to limit the scope of the description or the claims. As used herein, the word "may" is used in a permissive sense (i.e., meaning having the potential to) rather than the mandatory sense (i.e., meaning must). Unless specifically set forth herein, the terms "a," "an" and "the" are not limited to one element but instead should be read as meaning "at least one." The terminology includes the words noted above, derivatives thereof and words of similar import.

As used herein, the term "active" is defined as capable of acting on, interacting with or reacting with formaldehyde according to the invention, which action or interaction may include absorption and/or adsorption (and/or release) of the formaldehyde.

As used herein, the term "active agent" is defined as a material that (1) is immiscible with the base polymer and when mixed and heated with the base polymer and the channeling agent, will not melt, i.e., has a melting point that is higher than the melting point for either the base polymer or the channeling agent, and (2) acts on, interacts or reacts with a selected material. Specifically herein, the term "active agent" includes a material(s) that absorb or adsorbs the selected material and specifically herein, that absorbs or adsorbs formaldehyde.

As used herein, the term "activated carbon" refers to the collective name for a group of porous carbons manufactured by the treatment of a char with oxidizing gases or by carbonization of carbonaceous materials impregnated with dehydrating chemicals. The term "activated charcoal" is also commonly used. The term "activated" is colloquially used interchangeably with "active". Further chemical treatment or processing of the carbon often enhances the adsorption properties of the activated carbon and is referred to as "impregnated" activated carbon. The term "activated carbon" herein refers to both non-impregnated and impregnated activated carbon.

As used herein, the term "base polymer" is a polymer optionally having a gas transmission rate of a selected material that is substantially lower than, lower than or substantially equivalent to, that of the channeling agent. By way of example, such a transmission rate would be a water vapor transmission rate in embodiments where the selected material is moisture and the active agent is a water absorbing or formaldehyde adsorbing desiccant. The primary function of the base polymer is to provide structure and to enable functionality of the activated carbon.

As used herein, the term "channeling agent" is defined as a material that is immiscible with the base polymer and has an affinity to transport a gas phase substance at a faster rate than the base polymer alone. Optionally, a channeling agent is capable of forming channels through the base polymer when formed by mixing the channeling agent with the base polymer. Optionally, such channels are capable of transmitting a selected material through the entrained polymer at a faster rate than in solely the base polymer.

As used herein, the terms "channels" or "interconnecting channels" are defined as passages formed of the channeling agent that penetrate through the base polymer and may be interconnected with each other.

As used herein, the terms "container" or "package," and "packaging" may be used interchangeably herein to indicate a structural object that holds or contains a good or a product. Optionally, a package may include a container with a product stored therein. Non-limiting examples of a container, package and packaging include a box, a tray, a carton, a bottle, a vessel, a pouch, a blister pack and a bag. The package or container may be closed, covered and/or sealed using a variety of mechanisms including, for example, a cover, a lid, a lidding sealant, an adhesive and/or a heat seal. The package or container may be composed or constructed of various materials, such as plastics, metals, resins, glass, wood, combinations thereof and any other materials. In one optional embodiment, the package or container is composed of a rigid or semi-rigid polymer, optionally polypropylene or polyethylene, and preferably has sufficient rigidity to retain its shape under gravity.

As used herein, the term "entrained polymer" is defined as a monolithic material formed of at least a base polymer with an active agent and optionally also a channeling agent entrained or distributed throughout. An entrained polymer thus includes two-phase polymers (without a channeling agent) and three-phase polymers (with a channeling agent). Entrained polymers are described, for example, in U.S. Pat. Nos. 5,911,937, 6,080,350, 6,124,006, 6,130,263, 6,194,079, 6,214,255, 6,486,231, 7,005,459, and U.S. Pat. Pub. No. 2016/0039955, each of which is incorporated herein by reference in its entirety.

As used herein, the term "monolithic," "monolithic structure" or "monolithic composition" is defined as a composition or material that does not consist of two or more discrete macroscopic layers or portions. Accordingly, a "monolithic composition" is not itself a multi-layer composite, although a monolithic composition could form a layer of such a composite.

As used herein, the term "phase" is defined as a portion or component of a monolithic structure or composition that is uniformly distributed throughout, to give the structure or composition it's monolithic characteristics.

As used herein, the term "sorption" refers to both "absorption" and "adsorption", which may be used interchangeably herein. "Adsorption" refers to the adhesion of atoms, ions or molecules from a gas, liquid or dissolved solid to a surface. This process creates a film of the adsorbate on the surface of the adsorbent. "Absorption" is a process in which a fluid (the absorbate) is dissolved by or permeates a liquid or solid (the absorbent), respectively. Adsorption is a surface phenomenon, while absorption involves the whole volume of the material. The term "sorption" encompasses both processes.

As used herein, the term "three phase" is defined as a monolithic composition or structure comprising three or more phases. An example of a three phase composition according to an exemplary embodiment would be an entrained polymer formed of a base polymer, activated carbon, and channeling agent. Optionally, a three phase composition or structure may include an additional phase, e.g., a colorant or an additional desiccant.

Embodiments of the Invention

The present invention utilizes activated carbon as an active agent incorporated into a base polymer in order to function as a desiccant agent to remove or scavenge formaldehyde. The base polymer may optionally include one or more other additives. Optionally, the base polymer and the additive are miscible with one another. The activated carbon functions to absorb or adsorb formaldehyde due to the high surface area within the structure of the activated carbon. Further chemical treatment can enhance the adsorption properties of the activated carbon. The polymer compositions described herein may be used alone or in admixture with other solid absorbents or desiccants.

Without being bound by a mechanism of action, the activated carbon entrained polymer composition of the invention functions to remove, reduce, scavenge, control or modify the level of formaldehyde in an environment. In optional embodiments, material made of the polymer compositions herein are placed into a closed environment, such as a sealed chamber, a package or a container in order to measurably effectuate formaldehyde scavenging within such sealed or closed environment.

Activated carbon is a form of carbon or carbon material, (a char), that is treated during or after carbonization in order to increase its adsorptive properties. It is treated physically or chemically to generate micro-fissures that vastly increase its adsorptive surface area. The large surface area and electrical charge effectively adsorb a wide range of polar compounds. The char is processed to have small, low-volume pores that increase the surface area of the carbon particles available for adsorption or chemical reactions. Due to its high degree of microporosity, one gram of activated carbon may have a surface area in excess of 3000 $m^2$ (32,000 $ft^2$) as determined by gas adsorption. An activation level sufficient for useful sorption may be obtained solely from its high surface area. Activated carbon is usually derived from charcoal, but can also be derived from coal, coconut shell, wood, resin, and petroleum.

The activated carbon used herein may be impregnated or non-impregnated. Impregnated activated carbons are carbonaceous adsorbents which have chemicals finely distributed on their internal surface. The impregnation optimizes the existing properties of the activated carbon giving a synergism between the chemicals and the carbon. Numerous impregnated carbons are known in the industry and may be used in the polymer compositions and methods of the invention herein. An optional embodiment herein of an impregnated carbon is a tris(hydroxymethyl)aminomethane (Tris or TRIS) impregnated carbon. Optionally, a polymer composition of the invention contains from 1 to 30% Tris-impregnated activated carbon and from 70 to 99% of high-density polyethylene polymer (HDPE).

The activated carbon for use in the polymer compositions of the present invention can be of varying particle sizes. The activated carbon can be prepared from a raw material such as coal, coke, charcoal, coconut shell, wood, resin, petroleum residuum or by other known processes that render an activated carbon with a specific surface area of about 100 $m^2$/g to 2,000 $m^2$/g, typically between 500 and 1500 $m^2$/g. The activated carbon active agent may be provided in any form such as powder, crushed, granular, pelletized, spherical, cylindrical, fibriform or honeycombed form.

The activated carbons useful herein can be prepared by any variety of methods generally known in the industry and date as far back as U.S. Pat. No. 1,497,543 to Newcomb Chaney in 1919. According to the invention herein, any form of activated carbon that is manufactured or purchased from a valid supplier may be utilized for the polymer compositions and methods of the invention herein.

The polymer compositions of the invention may be prepared by common manufacturing processes such as extrusion, injection molding, blow molding and hot melting, wherein the activated carbon active agent is added to the base polymer during the manufacturing process and the materials are combined and generally admixed or blended with one another to some degree. The produced combination of the base polymer mixed with the activated carbon becomes an entrained polymer composition. According to the invention, the activated carbon does not necessarily need to be distributed uniformly throughout the base polymer in order to imbue formaldehyde scavenging properties to the entrained polymer composition. In an optional embodiment, the activated carbon may be uniformly or essentially uniformly distributed within the base polymer such that the entrained polymer composition becomes homogeneous or essentially homogeneous.

Referring now in detail to the Figures, like reference numerals refer to like parts throughout. Shown in FIGS. 1 to 5 are exemplary entrained polymers 10 useable in conjunction with aspects of the invention. The entrained polymers 10 each include a base polymer 25, a channeling agent 35 and the active agent being the activated carbon 30. As shown, the channeling agent 35 forms interconnecting channels 45 through the base polymer 10. At least some of the activated carbon 30 is contained within these channels 45, such that the channels 45 communicate between the activated carbon 30 and the exterior of the entrained polymer 10 via channel openings 48 formed at outer surfaces of the entrained polymer 25. While a channeling agent, e.g., 35, is preferred, in optional aspects, the invention also includes entrained polymers that do not include channeling agents.

Suitable base polymers include thermoplastic polymers, e.g., polyolefins such as polypropylene and polyethylene, polyisoprene, polyhydroxyalkanoates (PHAs), polylactique acid (PLA), polybutylene succinate (PBS), polybutadiene, polybutene, polysiloxane, polycarbonates, polyamides, ethylene-vinyl acetate copolymers, ethylene-methacrylate copolymer, poly(vinyl chloride), polyvinylpyrrolidone, polystyrene, polyesters, polyanhydrides, polyacrylianitrile, polysulfones, polyacrylic ester, acrylic, polyurethane and polyacetal, or copolymers or combinations thereof.

Suitable channeling agents include a polyglycol such as polyethylene glycol (PEG), ethylene-vinyl alcohol (EVOH), polyvinyl alcohol (PVOH), glycerin polyamine, polyurethane and polycarboxylic acid including polyacrylic acid or polymethacrylic acid. Alternatively, the channeling agent 35 can be, for example, a water insoluble polymer, such as a propylene oxide polymerisate-monobutyl ether, such as polyglykol B01/240, produced by Clariant Specialty Chemicals. In other embodiments, the channeling agent could be a propylene oxide polymerisate monobutyl ether, such as polyglykol B01/20, produced by Clariant Specialty Chemicals, propylene oxide polymerisate, such as polyglykol D01/240, produced by Clariant Specialty Chemicals, ethylene vinyl acetate, nylon 6, nylon 66, or any combination of the foregoing.

In general, it is believed that the higher the active agent concentration in the polymer compositions, the greater the sorption performance of the final composition. However, too high a concentration of the activated carbon could cause the entrained polymer to become increasingly brittle and the molten mixture of active agent, base polymer and channeling agent to be more difficult to either thermally form, extrude, injection mold or heat melt.

In optional embodiments of the invention, the loading level of the activated carbon within the entrained polymer composition can range from 10% to 80%, preferably 20% to 70%, more preferably from 30% to 60%, and even more preferably from 25% to 55% by weight with respect to the total weight of the entrained polymer. Optionally, the base polymer may range from 10% to 90% by weight of the total composition, preferably from 20% to 80% by weight. When an optional channeling agent is employed, the channeling agent may be provided in a range of 1% to 15% by weight, optionally 2% to 10%, preferably about 5%.

Figure 1:
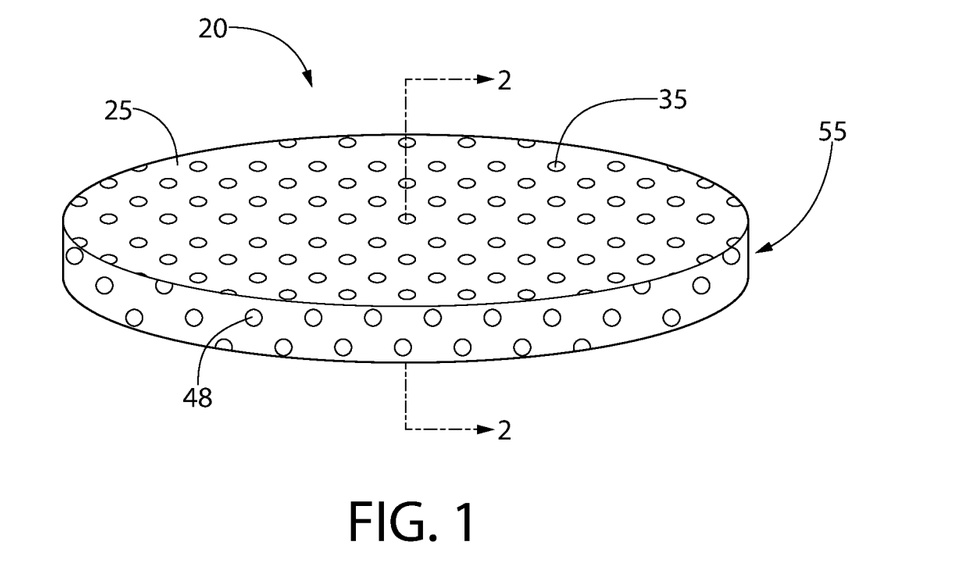
FIG. 1 is a perspective view of a plug formed of an entrained polymer according to an optional aspect of the present invention.

Referring to FIG. 1, an insert 20, constructed from the entrained polymer of the present invention is illustrated. The insert 20 is in the form of a plug 55 that may be deposited into a package or a chamber of a container in order to scavenge formaldehyde from a formaldehyde-producing object placed within the container.

Figure 2:
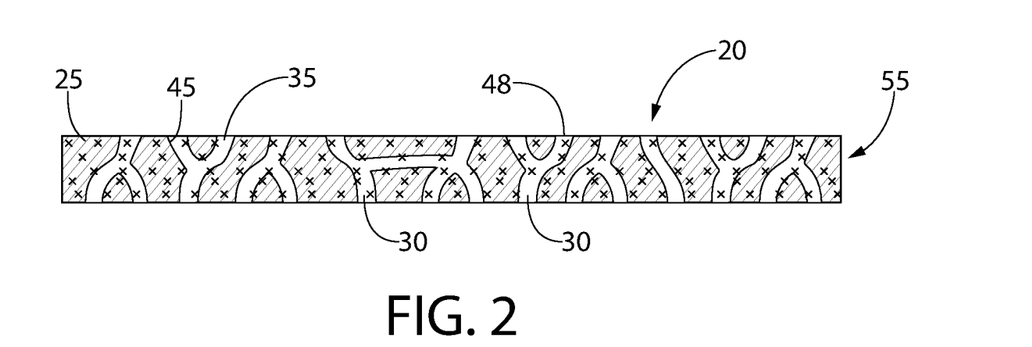
FIG. 2 is a cross section taken along line 2-2 of FIG. 1.

Referring to FIG. 2, a cross-sectional view is shown of the plug 55 that has been constructed from an entrained polymer 10 comprising the base polymer 25 that has been uniformly blended with the activated carbon 30 and the optional channeling agent 35. In the illustration of FIG. 2, the entrained polymer has been solidified so that interconnecting channels 45 have formed throughout the entrained polymer 10 to establish passages throughout the solidified plug 55. As may be appreciated from both FIGS. 1 and 2, the passages terminate in channel openings 48 at exterior surfaces of the plug 55 creating more surface area for the activated carbon to scavenge formaldehyde from the environment surrounding the polymer composition.

Figure 3:
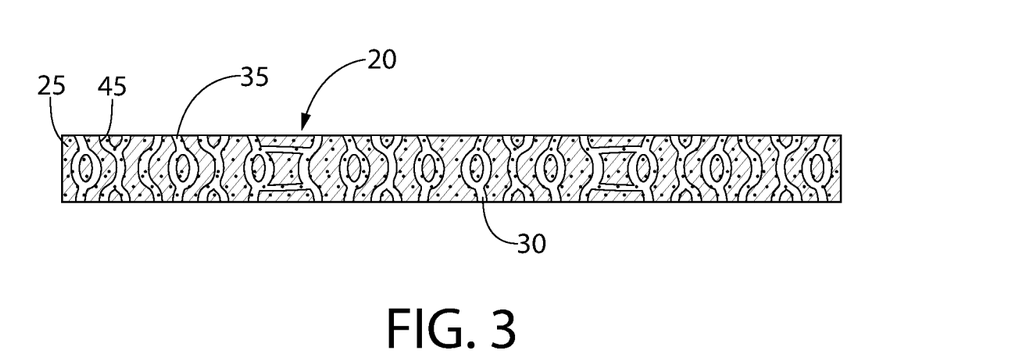
FIG. 3 is a cross section similar to that of FIG. 2, showing a plug formed of another embodiment of an entrained polymer according to the present invention, showing smaller channels than the embodiment of FIG. 1.

FIG. 3 illustrates the embodiment of a plug 55 similar in construction and makeup to the plug 55 of FIG. 2, where interconnecting channels 45 are very fine compared to those of FIG. 2. This can result from the use of a dimer agent (i.e., a plasticizer) together with the channeling agent 35. The dimer agent may enhance the compatibility between the base polymer 25 and the channeling agent 35. This enhanced compatibility is facilitated by a lowered viscosity of the blend, which may promote a more thorough blending of the base polymer 25 and channeling agent 35, which under normal conditions can resist combination into a uniform solution. Upon solidification of the entrained polymer 10 having a dimer agent added thereto, the interconnecting channels 45 which are formed throughout, have a greater dispersion and a smaller porosity, thereby establishing a greater density of interconnecting channels throughout the plug 55.

Figure 4:
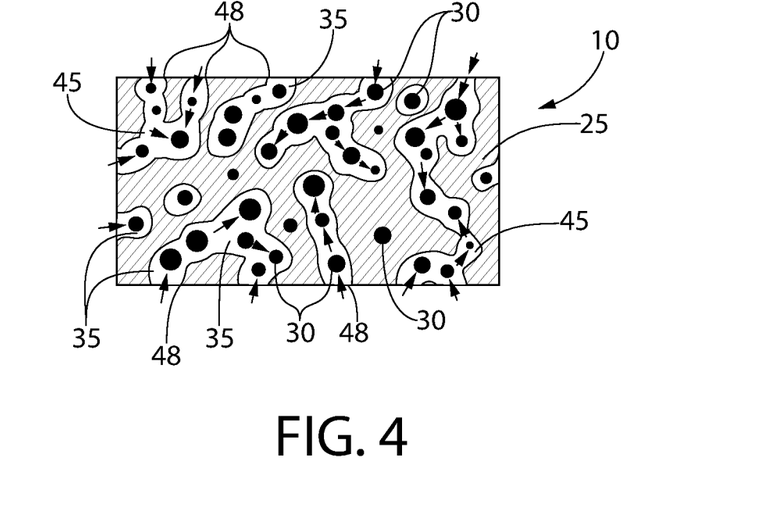
FIG. 4 is a close-up schematic illustration of FIG. 3, showing the entrained polymer according to the present invention with active carbon as the active agent and formaldehyde passing within and being absorbed or adsorbed within the polymer composition.
Figure 5:
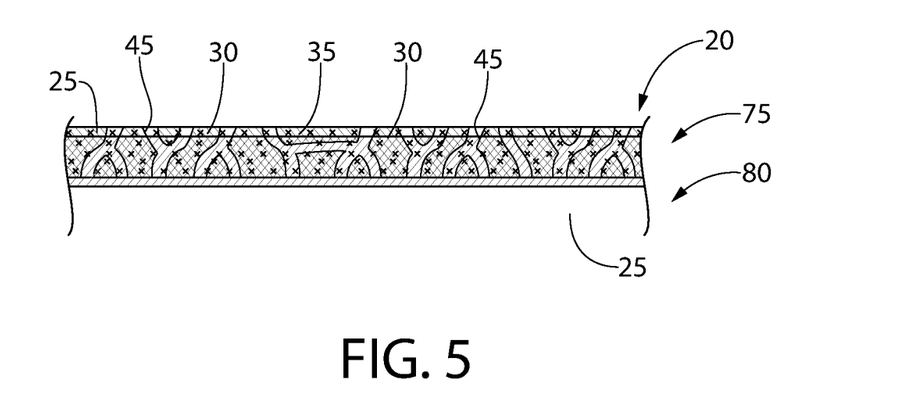
FIG. 5 is a cross-section schematic illustration of another embodiment of the entrained polymer in of the invention showing multiple layers of entrained film.

FIG. 4 illustrates a further embodiment of an entrained polymer 10 with activated carbon as the active agent 30, wherein the arrows indicate the path of the formaldehyde gas or, optionally, a liquid containing formaldehyde, from the exterior of the entrained polymer 10, through the channels 45, to the particles of the activated carbon 30, which upon contact functions to absorb or adsorb the formaldehyde within the channels.

The interconnecting channels 45, such as those disclosed herein, facilitate transmission of the formaldehyde throughout the base polymer 25, which otherwise generally resists permeation of the formaldehyde gas, thus acting as a barrier thereto. For this reason, the base polymer 25 itself acts as a barrier substance within which an active agent 30 may be entrained. The interconnecting channels 45 formed of the channeling agent 35 provide pathways for the formaldehyde to move through the entrained polymer 10. Without these interconnecting channels 45, it is believed that relatively small quantities of the desired material would be transmitted through the base polymer 25 to or from the active agent 30. The channels further allow a greater surface are of the activated carbon to come in contact with the formaldehyde. As such, the formaldehyde is transmitted to the activated carbon 30, and is absorbed or adsorbed by the activated carbon 30 in amounts much greater than by substances wherein the activated carbon is not entrained. Accordingly, in one aspect, an entrained polymer, comprising activated carbon as a sorption agent, and a base polymer are used in embodiments of the invention. In another aspect, an entrained polymer, comprising activated carbon as a sorption agent, a base polymer, and a channeling agent may be used in embodiments of the invention. However, in certain instances, especially where the selected base polymer does not have significant barrier properties and/or is provided in a thin film, performance of the entrained polymer may be suitable for a particular use without a channeling agent.

Optionally, in any embodiment, the activated carbon loading level ranges from 10% to 80%, optionally from 20% to 70%, optionally from 30% to 60%, optionally from 40% to 50%, optionally from 45% to 65%, optionally from 45% to 60%, optionally from 45% to 55%, optionally from 50% to 70%, optionally from 50% to 60%, optionally from 55% to 65%, optionally from 55% to 60% by weight with respect to the total weight of the entrained polymer composition.

Optionally, in any embodiment, the loading level of the base polymer ranges from 10% to 80%, optionally from 20% to 70%, optionally from 30% to 60%, optionally from 40% to 50%, optionally from 45% to 65%, optionally from 45% to 60%, optionally from 45% to 55%, optionally from 50% to 70%, optionally from 50% to 60%, optionally from 55% to 65%, optionally from 55% to 60%, 15% to 75%, optionally from 25% to 70%, optionally from 35% to 60%, optionally from 45% to 55%, optionally from 20% to 50%, optionally from 20% to 40%, optionally from 20% to 35%, optionally from 25% to 60%, optionally from 25% to 50%, optionally from 25% to 40%, optionally from 25% to 30%, optionally from 30% to 60%, optionally from 30% to 50%, optionally from 30% to 45%, optionally from 40% to 60%, optionally from 40% to 50% by weight of the entrained polymer composition.

Optionally, in any embodiment, the loading level of the optional channeling agent ranges from 1% to 25%, optionally from 2% to 15%, optionally from 5% to 20%, optionally from 5% to 15%, optionally from 5% to 10%, optionally from 8% to 15%, optionally from 8% to 10%, optionally from 10% to 20%, optionally from 10% to 15%, or optionally from 10% to 12% by weight with respect to the total weight of the entrained polymer.

Optionally, in any embodiment, an entrained polymer may be a two phase formulation including 20% to 50% by weight of the adsorbent agent, 50% to 80% by weight a base polymer (such as polypropylene). The base polymer are not particularly limited.

Optionally, in any embodiment, an entrained polymer may be a three phase formulation including 20% to 45% by weight of the adsorbent agent, 30% to 75% by weight a base polymer (such as polypropylene), and 1% to 12% by weight a channeling agent. The base polymer and the channeling agent are not particularly limited.

The methods of producing entrained polymers 10 according to the present invention are not particularly limited. Examples include blending a base polymer 25 and a channeling agent 35. The active agent 30 is blended into the base polymer 25 either before or after adding the channeling agent 35. All three components are uniformly distributed within the entrained polymer 10 mixture. The entrained polymer thus prepared contains at least two or three phases.

The form of the entrained polymer is not limited. Optionally, such entrained polymer may be formed into a component in the form of a film, a sheet, a disk, a pellet, a package, a container, a cover, a plug, a cap, a lid, an insert, a stopper, a cork, a gasket, a seal, a washer, a liner, or a ring. For example, if in the form of a film (e.g., an extruded film), the entrained polymer film has a thickness of from 0.1 mm to 1.0 mm, preferably from 0.2 mm to 0.6 mm, optionally about 0.2 or 0.3 mm.

Optionally, in any embodiment, the entrained polymer is provided, e.g., as a film, within a flexible package. For example, the film may be provided within a flexible pouch. Alternatively, the film may be provided in a blister pack. Exemplary blister packs utilizing atmospheric modifying polymer films are disclosed in U.S. Pat. No. 6,279,736 and WO 2018/145099, each of which is hereby incorporated by reference in its entirety. In optional embodiments, the blister pack comprises a backing and a cover attached to the backing, the cover and backing in combination forming at least one cavity for containing at least one entrained polymer film according to the invention and at least one product. Optionally, the product releases formaldehyde within the cavity and the entrained polymer film sorbs the formaldehyde. Optionally, the cover is a thermoformed polymer and the backing comprises foil. Optionally, the entrained polymer film is adhered to the backing. Optionally, in any embodiment, the entrained polymer's sorption of formaldehyde inhibits or prevents formaldehyde-induced degradation of the stored product.

In an optional embodiment, the entrained polymer is used as a formaldehyde sorption agent to prevent undesirable conversion of gelatin. Gelatin or gelatine is a translucent, colorless, flavorless food ingredient, derived from collagen taken from animal body parts. It is brittle when dry and gummy when moist. It may also be referred to as hydrolyzed collagen, collagen hydrolysate, gelatine hydrolysate, hydrolyzed gelatine, and collagen peptides after it has undergone hydrolysis. It is commonly used as a gelling agent in food, medications, drug and vitamin capsules, photographic films and papers, and cosmetics. Gelatin is an irreversibly hydrolyzed form of collagen, wherein the hydrolysis reduces protein fibrils into smaller peptides. The entrained polymer compositions of the invention can optionally be used to improve the integrity and stability of gelatin capsules in the pharmaceutical industry which is critical in maintaining the safety and effectiveness of the pharmaceutical product retained in the capsule. Formaldehyde causes cross-linking of gelatin particles. The formaldehyde scavenging property of the activated carbon within the entrained polymer functions to reduce the amount of formaldehyde within the composition of the gelatin which reduces cross-linking. Reduced cross-linking of gelatin particles improves the integrity of the gelatin capsules which may affect the chemical or physical properties of the pharmaceutical product within the gelatin capsule and thereby affect its safety or effectiveness.

In optional embodiments, other substituents may be added to the polymer compositions of the invention either to increase desiccant properties or to impart other desired properties for the end-use application. The use of combination active agents may provide certain advantages. For example, it is known that activated carbon absorbs formaldehyde from the environment in an amount which depends upon the temperature and decreases with increasing temperature. The polymer compositions of the invention may be combined with other ingredients that adsorb formaldehyde at higher temperatures. In an optional embodiment, a mixture of activated carbon particles is combined with polyhydric polymer such as hydroxyethylcellulose, glycerol and ambient moisture, which will function to remove formaldehyde from the air at room temperature, i.e. at approximately 25° C., as well as at elevated temperatures, e.g. 50° C. The activated carbon will absorb less formaldehyde at elevated temperatures than at room temperature, while the polyhydric polymer composition will react with more formaldehyde at elevated temperatures than at room temperature. Thus, the use of a mixture of polyhydric polymer composition and activated carbon scavenges formaldehyde at a range of temperatures.

According to an optional embodiment, provided herein is a method for reducing the amount or level of formaldehyde in a chamber or a container by providing therein an object and the entrained polymer composition of the invention. In certain embodiments, the method includes placing the polymer composition of the invention into a container or package that is subsequently sealed. Such method may improve the preservation and extension of shelf life of products such as pharmaceuticals, cosmetics, foods (such as, and not limited to fruits, vegetable, and other produce; fish, chicken, meat and others), herbs, tobacco, *cannabis*, and any other object that might exude or release some amount of formaldehyde. In one such embodiment, a method for preserving gelatin-containing products is provided. The method includes the step of storing the gelatin-containing product in a container that includes an entrained polymer composition or material of the invention.

Other methods and materials utilizing the entrained polymer compositions disclosed herein for the removal of gaseous formaldehyde from the atmosphere, from liquids or from closed chambers or containers, may be implemented without departing from the spirit and scope of the invention.

Examples

The following examples are illustrative embodiments of the practice of the present invention and are not to be construed as limitations on the invention or the claims.

Figure 6:
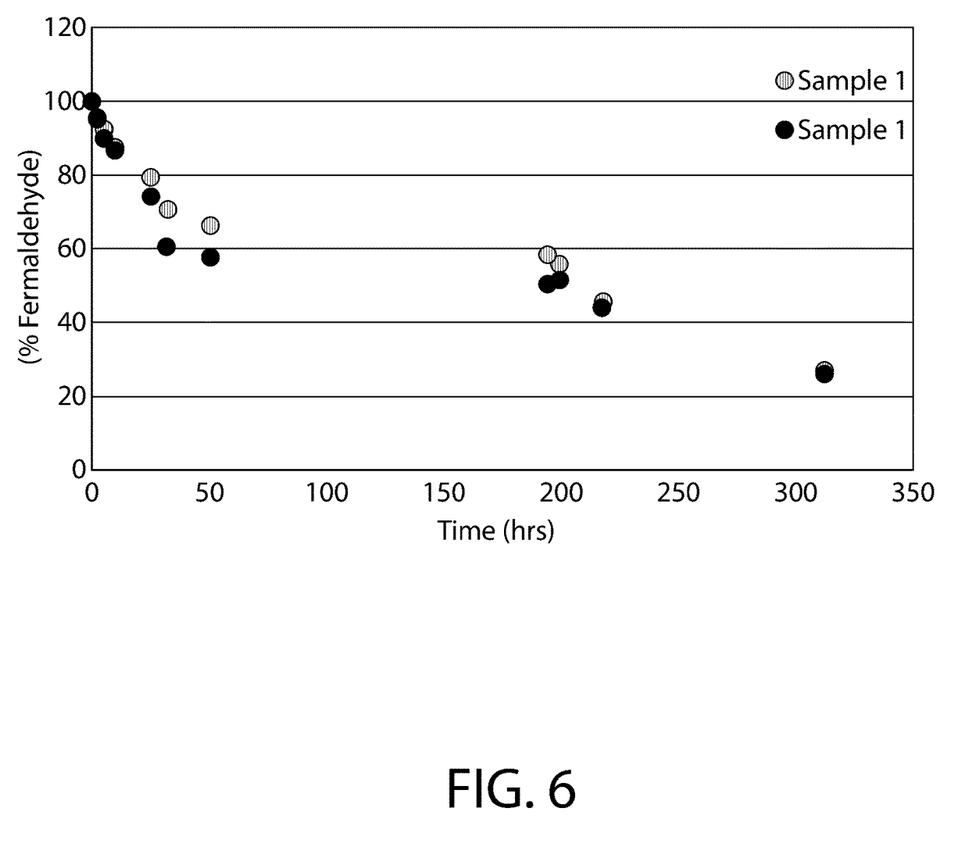
FIG. 6 is a graph illustrating formaldehyde uptake of the entrained polymer material according to optional embodiments the invention in accordance with Example 1.

Two samples of entrained polymer compositions according to the invention were prepared having a concentration of 70% high-density polyethylene polymer (HDPE) with 30% activated carbon based on the total weight of the polymer composition. The activated carbon of Sample 1 was treated with an acid wash and steam for activation. The activated carbon of Sample 2 was treated with steam only. The polymer composition was extruded into 1 inch×1 inch film samples with a thickness of less than 1 mm Each sample film was placed into a chamber, the chamber was sealed and the results recorded. The tested chamber contained 150 ppm formaldehyde concentration at the beginning of the experiment and held at ambient conditions at 22° C. The formaldehyde concentration in the chamber was monitored over a period of approximately 12 days. The formaldehyde uptake of film Samples 1 and 2 are plotted in FIG. 6, with 100% denoting the starting formaldehyde concentration of 150 ppm. The results demonstrated a significant decrease in the level of formaldehyde in the test chamber as shown in FIG. 6. Based on the results as set forth in FIG. 6, the percentage of formaldehyde decreased to as low as approximately 25% as compared to the amount of formaldehyde measured in the test chamber at the beginning of the test period, demonstrating an approximately 75% reduction of formaldehyde as a result due to sorption by the polymer composition of the invention. A control sample of HDPE polymer film (without any activated carbon or other sorption agent) enclosed in a test chamber under the same conditions did not show any reduction in formaldehyde level.

The amount of the formaldehyde in the enclosed container could be further reduced by providing additional test film strips into the container or by increasing the load level of the activated carbon within the polymer composition.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the present presently disclosed technology.

What is claimed is:

1. A process for reducing the amount of volatile organic compound in a closed chamber or container comprising the steps of:
   (1) enclosing an entrained polymer composition within the chamber or container, the entrained polymer composition being a monolithic material comprising:
      (a) from 20 to 70% by weight of a base polymer selected from polypropylene, polyethylene, polyisoprene, polyhydroxyalkanoates (PHAs), polylactic acid (PLA), polybutylene succinate (PBS), polyhexene, polybutadiene, polybutene, polysiloxane, polycarbonate, polyamide, ethylene-vinyl acetate copolymer, ethylene-methacrylate copolymer, polyvinyl chloride (PVC), polystyrene, polyester, polyanhydride, polyacrylonitrile, polysulfone, polyacrylic ester, acrylic, polyurethane, polyacetal, polyvinylpyrrolidone (PVP), a copolymer, or a combination thereof;
      (b) from 20 to 70% by weight of activated carbon, wherein the activated carbon is tris(hydroxymethyl) aminomethane impregnated carbon; and
      (c) from 2 to 15% by weight of a channeling agent that is defined as a polymer material that is immiscible with the base polymer and has an affinity to transport a gas phase substance at a faster rate than the base polymer alone, wherein the channeling agent is selected from polyethylene glycol (PEG), ethylene-vinyl alcohol (EVOH), polyvinyl alcohol (PVOH), glycerin polyamine, polyurethane, polycarboxylic acid, propylene oxide polymerisate-monobutyl ether, propylene oxide polymerisate, ethylene vinyl acetate, nylon 6, nylon 66, or a combination thereof, wherein the % by weight are based on the total weight of the entrained polymer composition, and wherein the activated carbon and the channeling agent are distributed throughout the entrained polymer; and
   (2) allowing the entrained polymer composition in the chamber or container to reduce the amount of the volatile organic compound.

2. The process of claim 1, wherein the base polymer is polypropylene or polyethylene and the channeling agent is polyethylene glycol.

3. The process of claim 1, wherein the distribution of activated carbon within the base polymer of the entrained polymer composition is homogeneous.

4. The process of claim 1, wherein the volatile organic compound is formaldehyde.

5. The process of claim 1, further comprising placing a volatile organic compound releasing object that is a pharmaceutical product into the chamber or container, wherein the polymer composition reduces the amount of volatile organic compound released by the object.

6. The process of claim 1, wherein the entrained polymer is provided as a film.

7. The process of claim 6, wherein the volatile organic compound is formaldehyde.

8. The process of claim 5, wherein the polymer composition does not physically contact the volatile organic compound releasing object.

9. The process of claim 8, wherein the film has a thickness of from 0.1 mm to 1.0 mm.

10. The process of claim 8, further comprising providing the film in a blister pack.

11. The process of claim 10, wherein the blister pack comprises:
a backing;
a cover attached to the backing; and
at least one cavity formed by a combination of the backing and the cover.

12. The process of claim 11, wherein the film is adhered to the backing.

13. The process of claim 11, wherein the film is disposed in the at least one cavity.

14. The process of claim 11, further comprising a pharmaceutical product in the at least one cavity, the pharmaceutical product emitting the volatile organic compound, the film being effective to reduce the volatile organic compound within the at least one cavity.

* * * * *